March 1, 1955  H. E. SLOAN ET AL  2,703,242
COMBINATION WORK CENTERING AND COMPENSATING JAW CHUCK
Filed March 28, 1952  2 Sheets-Sheet 1

Inventors:
Harry E. Sloan
and Linwood B. Swanson
By: Earle & Steward
Attorneys.

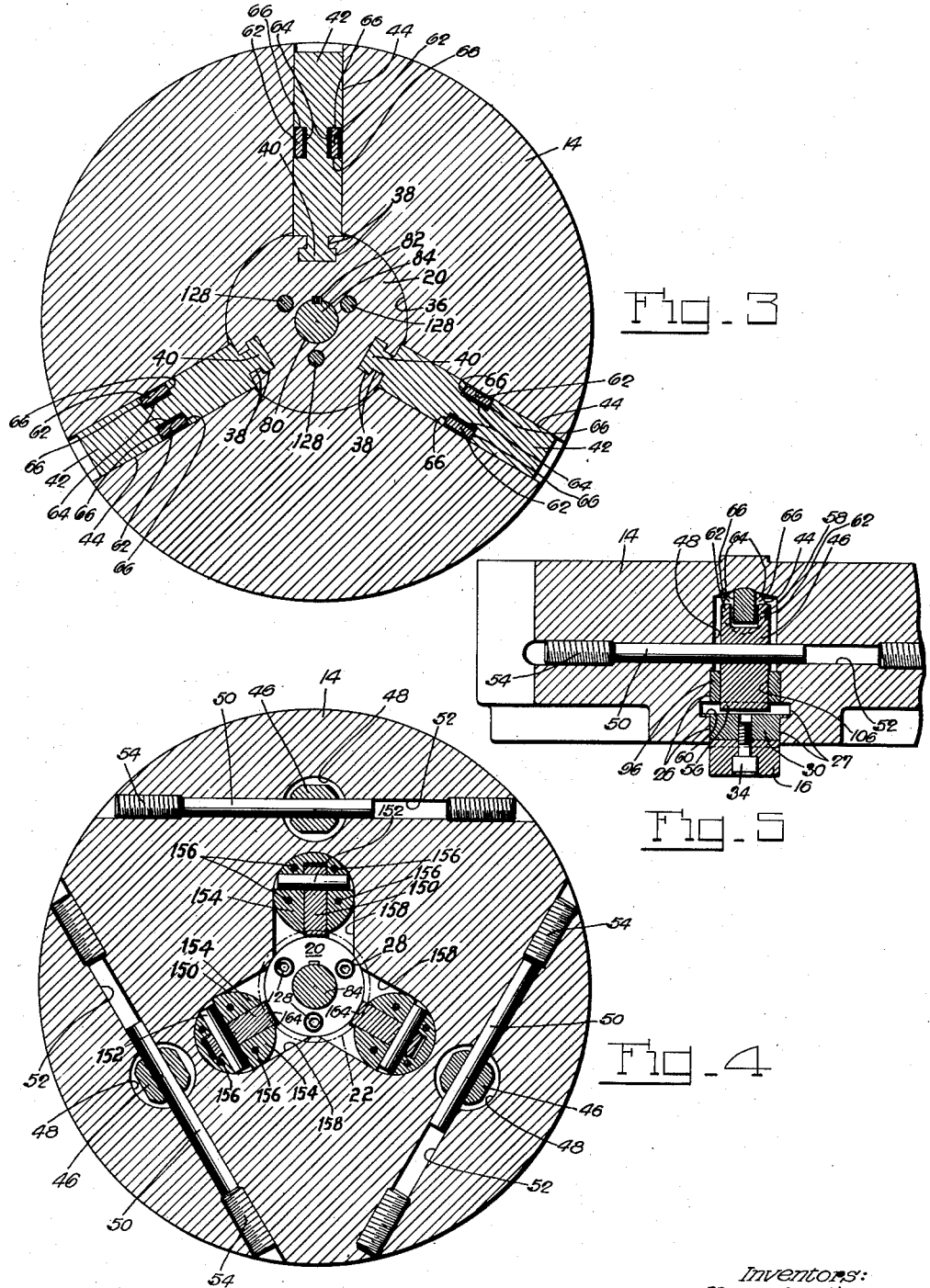

2,703,242
// Patented Mar. 1, 1955

UNITED STATES PATENT OFFICE

2,703,242

COMBINATION WORK CENTERING AND COMPENSATING JAW CHUCK

Harry E. Sloan, Hartford, and Linwood B. Swanson, New Britain, Conn., assignors to The Cushman Chuck Company, a corporation of Connecticut Application March 28, 1952, Serial No. 279,072

16 Claims. (Cl. 279—4)

This invention relates to work-holding chucks in general, and to chucks of the self-compensating inner and outer jaw type in particular.

An example of a chuck of this particular type is shown and described in the copending application of Harry E. Sloan, Serial No. 228,839, filed May 29, 1951. This previous chuck comprises equi-angularly spaced pairs of aligned outer and inner jaws for gripping a cylindrical wall or wall portion of work to be held. In the example shown in said copending application, the outer jaws are the work-centering jaws, while the inner jaws are of the self-compensating type and cooperate with the associated outer jaws in gripping the cylindrical wall or wall portion of the work internally and externally with equal pressure despite possible slight variations in the wall thickness of the work. To move the inner and outer jaws into and from work-gripping engagement, there are provided centrally arranged and coaxially aligned jaw actuators which are axially reciprocated in opposite directions by means of the same fluid under pressure, and which have driving connections with the inner and outer jaws, respectively, of which the driving connection with each jaw includes a toggle link. Moreover, the jaw actuator for the inner jaws is, in this instance, free to float to a limited extent transversely of its direction of reciprocation to thereby lend the characteristic of self-compensation to the inner jaws. This previous chuck has many noteworthy advantages which are described in said copending application and repeated hereinafter. However, this previous chuck, while performing admirably on different work of substantially the same wall thickness, does not readily lend itself to gripping with the desired or necessary force different work of more widely varying wall thicknesses. This is due to the fact that secure clamping action of the jaws requires substantial self-locking of the toggle links in their clamping positions so that they will transmit only negligible reacting forces, if any, from the clamped work to the respective fluid-pressure operated jaw actuators, yet when the jaws grip different work of more widely varying wall thicknesses these toggle links will considerably deviate from the inherently limited range of clamping positions in which they are self-locked to the extent indicated, with the result that the clamping action of the jaws will not be secure and the toggle links will more or less freely transmit reacting forces from the clamped work to the respective fluid-pressure operated jaw actuators.

Accordingly, it is an object of the present invention to provide a chuck of this type which has all the advantages of the above-mentioned previous chuck, and which additionally lends itself to the secure clamping of different work of considerably varying wall thicknesses.

It is another object of the present invention to provide a chuck of this type of which the jaws grip different workpieces with the same uniform force regardless of considerable variations of their wall thicknesses.

A further object of the present invention is to provide a chuck of this type which is of relatively simple, self-contained and lasting construction, yet is highly accurate and reliable in its performance, and which readily lends itself to efficient mass production, as well as to the repair or replacement of any part or parts thereof if necessary.

Other objects and advantages will appear to those skilled in the art from the following, considered in conjunction with the accompanying drawings.

In the accompanying drawings, in which certain modes of carrying out the present invention are shown for illustrative purposes:

Figure 1:
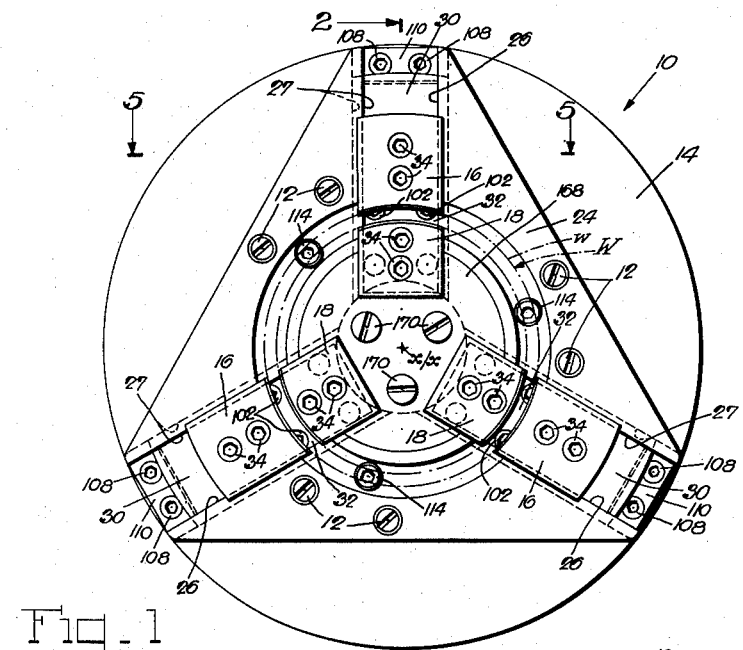
Fig. 1 is a front view of a chuck embodying the present invention.
Figure 2:
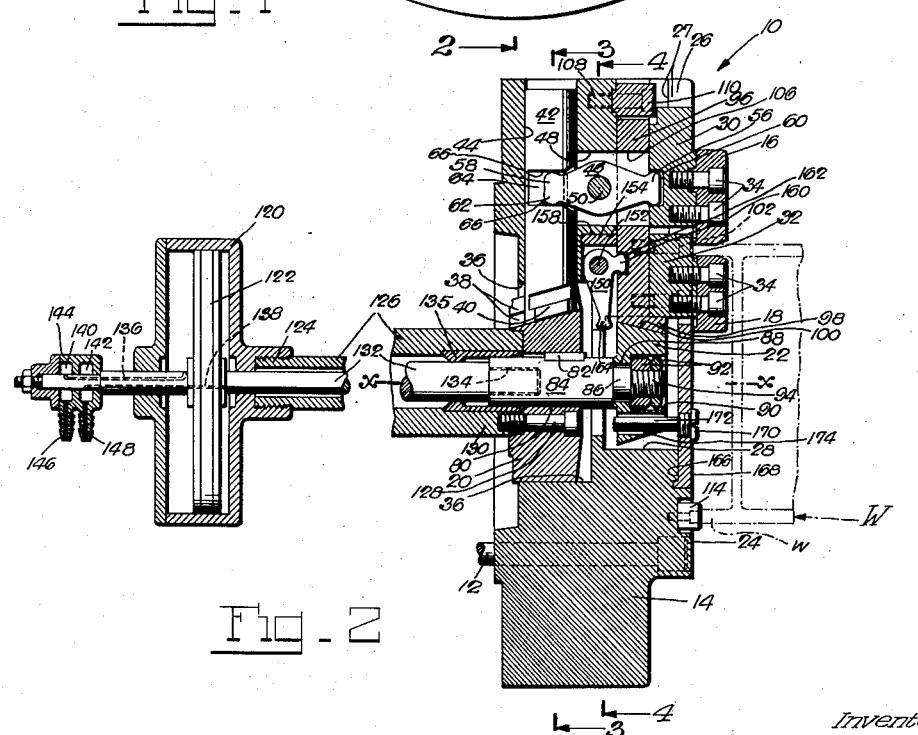
Fig. 2 is a section through the chuck as taken on the line 2—2 of Fig. 1.

Figs. 3 and 4 are sections through the chuck taken on the lines 3—3 and 4—4, respectively, of Fig. 2; and Fig. 5 is a fragmentary section through the chuck taken on the line 5—5 of Fig. 1.

Referring to the drawings, and more particularly to Figs. 1 and 2 thereof, the reference numeral 10 designates a chuck which may releasably be secured by bolts 12 to the face plate on the power spindle of a lathe or other machine tool (not shown). The chuck 10 comprises a chuck body 14 which carries most of the essential operating parts of the chuck. Among these essential operating parts are series or groups of outer and inner jaws 16 and 18, respectively, which in this instance are adapted to grip tubular work or a tubular portion of work externally and internally, movable actuators 20 and 22 for the outer and inner jaws 16 and 18, respectively, and suitable follower provisions between these actuators and the respective jaws.

The chuck body 14 is in its front face 24 provided with a plurality of equi-angularly spaced guide grooves 26, in this instance three, which extend substantially radially of the central axis x—x of the body and merge into a central annular recess 28 therein. Each of these guide grooves 26 is near the front face 24 of the chuck body dove-tailed as at 27 for the fitted reception of slides 30 and 32 which serve as carriers for a pair of associated outer and inner jaws 16 and 18, respectively, the latter being conveniently mounted on their respective carriers 30 and 32 by screws 34. Figs. 1 and 2 show the outer and inner jaws 16 and 18 in their respective clamping positions in which they grip a cylindrical wall w of work W externally and internally.

The jaw actuator 20, which is in the form of a cylindrical member, is received and guided for axial movement in a central recess 36 in the back of the chuck body 14 (Fig. 2). Machined into the periphery of the jaw actuator 20 are three equi-angularly spaced dove-tail guide grooves 38 (Figs. 2 and 3) which are equally inclined to the central axis x—x of the chuck body 14. Received with a sliding fit in each inclined guide groove 38 in the jaw actuator 20 is the correspondingly shaped foot end 40 of a follower 42 which in the present instance is in the form of a cylindrical plunger slidably received in a radial bore 44 in the chuck body 14. Accordingly, the inclined guide grooves 38 in the jaw actuator 20 act as cams which will move their respective followers 42 in opposite directions on axial movement of the jaw actuator 20 in opposite directions. To transmit the cam-controlled to-and-fro motions of the followers 42 to the adjacent outer jaw-carriers 30, respectively, each follower 42 is operatively connected with its respective jaw-carrier 30 by means of a rocker 46. Each rocker 46 extends through and is pivotally mounted in an aperture 48 in the chuck body which is open to the adjacent bore 44 and guide groove 26 (Figs. 2 and 4). Conveniently, each rocker 46 may be pivoted in its aperture 48 on a pin 50 inserted in a through-bore 52 in the chuck body 14 and held therein by being threadedly received with one end 54 in the bore 52 (Fig. 4). Both ends 56 and 58 of each rocker 46 are preferably roller-shaped at least in part, and the rocker end 56 projects into a transverse groove 60 in back of the adjacent outer jaw-carrier 30 to impart to the same radial to-and-fro movement when the rocker is rocked in opposite directions (Figs. 2 and 5). The other end 58 of each rocker 46 is bifurcated (Figs. 2 and 5) so that the end prongs 62 straddle machined opposite flats 64 in the adjacent follower 42 intermediate its length, and are in follower engagement with shoulders 66 formed in the follower by the machined flats therein. Accordingly, on sliding the jaw actuator 20 to the left into the clamping position shown in Fig. 2, the followers 42 will be cammed outwardly and the rockers 46 will transmit the outward motions of the followers to the respective outer jaw-carriers 30 as inward motions to bring the outer jaws 16 into gripping engagement with the work W. Conversely, on sliding the jaw actuator 20 to the right from the clamping position shown in Fig. 2, the followers 42 will be cammed inwardly and the rockers 46 will transmit the inward motions of the followers to the respective outer jaw-carriers 30 as outward motions to retract the outer jaws 16 from gripping engagement with the work W.

Guided for axial sliding movement in a central bore 80 in the jaw actuator 20, and splined therein as at 82, is a stub shaft 84 having a forward shank 86 on which the previously mentioned jaw actuator 22 is mounted. The actuator 22 for the inner jaws 18 is, in the present instance, in the form of a frusto-cone, centrally bored at 88 for the reception of the shaft shank 86, and counterbored at 90 for the reception of nuts 92 which are received by a threaded end length 94 of the shaft shank 86 for the secure anchorage on the latter of the jaw actuator 22. Slidable in each guide groove 26 in the chuck body 14 immediately behind the dove-tailed front portion 27 thereof is a follower 96 of general L-shape (Figs. 2 and 5), having on its foot 98 an inclined follower surface 100 which in this instance is plane and rests against the adjacent periphery of the jaw actuator 22. Mounted by screws 102, for instance, on each follower 96 is the adjacent inner jaw carrier 32. Accordingly, the inner jaws 18 will be moved outwardly into gripping engagement with the work W on axial movement of the stub shaft 84 and jaw actuator 22 thereon to the right into the clamping position shown in Fig. 2. The jaw actuator 22 itself will not retract the inner jaws 18 from gripping engagement with the work W, but will permit them to retract therefrom, on movement of the jaw actuator 22 to the left from the clamping position shown in Fig. 2, as will be readily understood.

Each follower 96 preferably extends near the outer end of its respective guide groove 26 in the chuck body 14 (Fig. 2), and is provided with an elongated slot 106 through which the adjacent rocker 46 extends with slight clearance (Fig. 5). In order to retain the various operating parts of the chuck body 14 thereof on disassembly and removal of the jaw actuators 20 and 22 therefrom for repair or part-replacement purposes, for instance, there is suitably mounted at 108 in the outer end of each guide groove 26 in the chuck body a stop member 110 which, when not removed, will prevent removal of the adjacent follower 96 and outer jaw-carrier 30 (Fig. 2).

The bore 88 in the jaw actuator 22 has sufficient clearance from the shank 86 of the stub shaft 84 to have limited floating movability laterally of the central axis x—x of the chuck body 14 (Fig. 2). To preserve this limited floating movability of the jaw-actuator 22, the nuts 92 are not appreciably, if at all, tightened against the jaw actuator 22 and are instead locked against each other without interfering with the desired freedom of floating motion of this jaw-actuator. By virtue of the lateral floating movability of the jaw actuator 22, the inner jaws 18 are self-compensating to the extent where they will uniformly engage the work interiorly despite considerable variations in the wall thickness of a particular workpiece or abnormal deformations on the inside of the wall. In contrast to the self-compensating inner jaws 18 of the present example, the outer jaws 16, having no relative floating movability, assume the function of centering the work exteriorly and are, therefore, the work-centering jaws. It is, of course, fully within the purview of the present invention to mount the jaw actuator 22 without any floating movability, and instead mount the other jaw actuator 20 so that the same has limited floating movability laterally of the central axis x—x of the chuck body 14, in which case the work W will be centered by the inner jaws and the outer jaws become the self-compensating jaws.

The instant chuck is on its front face preferably provided with a plurality of angularly-spaced hardened work rests 114 against which the work is held prior to and during chucking for its accurate lengthwise location relative to the jaws 16 and 18.

It will be noted from Fig. 2 that the jaw actuators 20 and 22 will have to move in opposite directions in order to cause the jaws 16 and 18 to move into gripping engagement with the work W. To accomplish simultaneous movement of the outer and inner jaws 16 and 18 into gripping engagement with the work W, and also the exertion of identical clamping pressures by all jaws on the work, the jaw actuators 20 and 22 are operatively connected with a fluid-pressure cylinder 120 and a piston 122 therein, respectively (Fig. 2). To this end, the cylinder 120 is mounted on one end 124 of an operating sleeve 126 which may suitably be guided for longitudinal sliding movement in the lathe or other machine tool in which the instant chuck is mounted. The jaw actuator 20 is removably mounted, by screws 128, for instance, on the other end 130 of the operating sleeve 126. The rod 132 of the piston 122 extends through the operating sleeve 126 and is threadedly connected at 134 with the stub shaft 84 that extends into a bushing 135 in the operating sleeve 126. The piston 122 is, in this instance, of the double-acting type, having in its rod 132 fluid passages 136 and 138 the inner ends of which are in communication with the left and right sides, respectively, of the cylinder 120 as viewed in Fig. 2. The outer ends of the passages 136 and 138 are in communication with separate chambers 140 and 142, respectively, in a distributor casing 144 on the piston rod 132. The chambers 140 and 142 in the distributor casing 144 have suitable passages 146 and 148, respectively, for connection with conduits that may lead, for instance, to the outlets of any suitable two-way valve (not shown) for directing fluid under pressure to either side of the cylinder and simultaneously venting the other side thereof. In the exemplary relative position of the cylinder and piston shown in Fig. 2, fluid under pressure is admitted to the left or working side of the cylinder, with the result that the instant chuck is in work-gripping condition. Conversely, the outer jaws 16 will be withdrawn from gripping engagement with the work and the inner jaws 18 will at the same time be permitted to withdraw from the work, on admitting fluid under pressure to the right side of the cylinder 120 and simultaneously venting the opposite side thereof.

Provisions are also made for positively withdrawing the inner jaws 18 from gripping engagement with the work W if they should fail to withdraw therefrom of their own accord on admitting fluid under pressure into the right side of the cylinder 120 for the release of the work. To this end, there are provided three jaw-retractors 150, one for each inner jaw 18, which are pivotally mounted on pins 152 in bearing discs 154, respectively, secured at 156 in recesses 158, respectively, in the chuck body 14 (Figs. 2 and 4). Each of the jaw-retractors 150 is in the form of a bell-crank lever of which the shorter arm 160 is received in a transverse groove 162 in the back of a follower 96, while the longer arm 164 is in the path of the jaw-actuator 22. Accordingly, the jaw actuator 22 will, on each work-release stroke thereof to the left as viewed in Fig. 2, strike against the arms 164 of the jaw-retractors 150 and rock the same for the positive retraction of the inner jaws 18 from gripping engagement with the work W if they are not already retracted therefrom at that time.

Provided in the front face 24 of the chuck body 14 is an annular recess 166 in which is removably secured in any suitable manner a cover plate 168. Mounted in the cover plate 168 are a plurality of screws 170 having bare shanks 172 which are in alignment with the bolts 128, respectively, and extend through apertures 174 in the jaw actuator 22 with sufficient clearance to permit the before-mentioned limited floating movability of the latter laterally of the central axis x—x of the chuck body. The provision of these screws 170 greatly facilitates the connection of the instant chuck with, and its disconnection from, the operating sleeve 126 and piston rod 126. Thus, while the piston rod 132 may readily be screwed into or unscrewed from the stub shaft 84 by simply turning the cylinder and piston assembly 120, 122 in the proper directions, it is the connection of the operating sleeve 126 with, and its disconnection from, the jaw actuator 20 which would require substantial disassembly of the instant chuck if it were not for the screws 170 and their clearance apertures 174 in the jaw actuator 22. Without the provision of the screws 170 and their clearance apertures 174 in the jaw actuator 22, the inner jaws 18, which overlap the cover plate 168, would have to be removed from their respective carriers 32, the cover plate 168 next would have to be removed from the chuck body, whereupon the jaw actuator 22 would have to be removed from the stub shaft 84, before access could be had to the bolts 128 for the connection of the jaw actuator 20 with, or its disconnection from, the operating sleeve 126. With the provision of the screws 170 and their clearance apertures 174 in the jaw actuator 22, immediate access to the bolts 128 with a screw driver may be had simply by temporarily removing the screws 170, as will be readily understood.

The periphery of the frusto-conical jaw actuator 22 and the inclined guide grooves 38 in the other jaw actuator 20 serve as cams which are preferably of uniform-motion design and preferably have the same inclinations relative to the central axis $x$—$x$ of the chuck body 14. With this arrangement, the outer and inner jaws 16 and 18 move uniformly into gripping engagement with the work W. The jaws 16 and 18 also apply equal clamping pressures to the work from the inside and outside when fluid under pressure is admitted to the left or working side of the cylinder 120. In thus clamping the work W to the chuck, the work is not in the least subjected to any stresses which might distort or break the work. Further, the overall clamping pressure of the outer and inner jaws 16 and 18 may be selected so as assuredly to turn the work against even exceptionally high resistance of a tool performing its operation thereon, and may be far in excess of the maximum permissible clamping pressure if the work were gripped only from the outside or from the inside. Of great importance is the instant chuck's capacity securely to grip different workpieces of considerably varying wall thicknesses, an advantage not shared by the chuck disclosed in the before-mentioned copending application of Harry E. Sloan. In connection herewith, it is noteworthy that the instant chuck, while capable of securely gripping workpieces of considerably varying wall thicknesses, lends itself to the secure gripping of workpieces of considerably varying outside dimensions or of considerably varying inside dimensions, regardless of any variations in their wall thicknesses. In the light of this, the fluid-pressure operation of the jaw actuators 20 and 22 assumes especial significance. Thus, assuming that during the simultaneous clamping strokes of the jaw actuators 20 and 22 the outer jaws 16 will engage a particular workpiece of considerable outside dimension before the inner jaws 18 come into engagement with the inner wall surface thereof, then the outer jaws 16 will exert only negligible clamping pressure on the work until the inner jaws 18 also engage the work, whereupon the outer and inner jaws will simultaneously exert their full and even clamping pressures on the work without setting up any stresses therein other than harmless compressive stresses in the wall portions between the engaging outer and inner jaws. Similarly, if during the simultaneous clamping strokes of the jaw actuators 20 and 22 the inner jaws 18 should engage a particular workpiece before the outer jaws 16 move into engagement therewith, the outer and inner jaws will exert their full clamping pressures on the work only after all jaws are in engagement with the work. In addition to the adaptability of the instant chuck to the secure gripping of different workpieces of considerably varying outside or inside dimensions and/or considerably varying wall thicknesses, the lateral floatability of the jaw actuator 22 assures secure gripping of a workpiece the wall thickness of which may vary to some extent. Further, despite considerable variations in the wall thicknesses of different workpieces, the instant chuck will securely grip them all because the inclination of the guide grooves 38 in the jaw actuator 20 to the central axis $x$—$x$ of the chuck body 14 and the taper of the frusto-conical jaw actuator 22 are such as to transmit only negligible reacting forces, if any, from the clamped work to the respective fluid-pressure operated jaw actuators.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. In a chuck having a body with a central axis and angularly spaced pairs of aligned inner and outer work-gripping jaws which are movable on the body substantially radially of said axis and of which said inner and outer jaws are arranged in groups, respectively, the combination of two members independently movable in said body in the direction of its central axis, each of said members having identical cam portions associated with the jaws, respectively, of a group; separate follower means connecting the jaws of each pair with the associated cam portions, respectively, of said members for moving said connected jaws in opposite direction into gripping engagement with work on certain movements of said members and one of the said members being floatable laterally of said body axis to render the jaws of the associated group self-compensating; and means for thus moving said members.

2. In a chuck having a body with a central axis and angularly spaced pairs of aligned inner and outer work-gripping jaws which are movable on the body substantially radially of said axis and of which said inner and outer jaws are arranged in groups, respectively, the combination of two members independently movable in said body in the direction of its central axis, each of said members having identical cam portions associated with the jaws, respectively, of a group; separate follower means connecting the jaws of each pair with the associated cam portions, respectively, of said members for moving said connected jaws in opposite directions into gripping engagement with work on movement of said members in opposite directions, respectively; and a cylinder and a piston therein, each being movable relative to the other and both being operatively connected with said members, respectively, for moving the latter in said opposite directions on admission of fluid under pressure into said cylinder.

3. The combination in a chuck as set forth in claim 2, in which the cam portions of each member are uniform-motion cams.

4. The combination in a chuck as set forth in claim 2, in which the cam portions of each member are uniform-motion cams, and the cam actions of both members are identical.

5. The combination in a chuck as set forth in claim 2, in which one of said members is floatable laterally of said body axis to render the jaws of the associated group self-compensating.

6. In a chuck having a body with a central axis and angularly spaced pairs of aligned inner and outer work-gripping jaws which are movable on the body substantially radially of said axis and of which said inner and outer jaws are arranged in groups, respectively, the combination of two members independently movable in said body in the direction of its central axis, each of said members having identical cam portions associated with the jaws, respectively, of a group; follower means connecting the cam portions of one member with the jaws, respectively, of the associated group for moving them into and from a gripping engagement with work on movement of said one member in opposite directions, respectively; other follower means connecting the cam portions of the other member with the jaws, respectively, of the associated group for moving them into gripping engagement with work on movement of said other member in one of its opposite directions of movement; means for moving each member in its opposite directions; and levers pivoted intermediate their ends in said body, each of said levers being operatively connected at one end with one of the associated jaws of said other member and having its other end in the path of said other member to be rocked thereby, on movement of the latter in a direction opposite to said one direction thereof, for the positive withdrawal of the associated jaws from gripping engagement with work.

7. The combination in a chuck as set forth in claim 6, in which said other member is floatable laterally of said body axis to render the jaws of the associated group self-compensating.

8. In a chuck having a body with a central axis and angularly spaced pairs of aligned inner and outer work-gripping jaws movable on the body substantially radially of its axis, the combination of a member movable in said body back and forth in the direction of said central axis and having identical cam portions; follower means connecting the cam portions of said member with said outer jaws, respectively, for moving them into gripping engagement with work on movement of said member in one of its opposite directions of movement; a frusto-cone reciprocable in said body coaxially thereof, said inner jaws having follower surfaces, respectively, bearing against the periphery of said frusto-cone so as to be moved outwardly into gripping engagement with work on movement of said frusto-cone in one of its opposite directions of movement and said frusto-cone being also floatable laterally of said body axis to render said inner jaws self-compensating; and means for moving said member and frusto-cone in their opposite directions.

9. The combination in a chuck as set forth in claim 8, further comprising levers pivoted intermediate their ends in said body, each of said levers being operatively connected at one end with one of said inner jaws and having its other end in the path of said frusto-cone to be rocked thereby, on movement of the latter in a direction opposite to said one direction thereof, for the positive withdrawal of said inner jaws from gripping engagement with work.

10. In a chuck having a body with a central axis and angularly spaced pairs of aligned inner and outer work-gripping jaws movable on the front of the body substantially radially of its axis, the combination of a member having a longitudinal axis and being movable in said body coaxially thereof, said member having identical cam grooves; follower means connecting the cam grooves of said member with said outer jaws, respectively, for moving them into and from gripping engagement with work on movement of said member in opposite directions, respectively; a frusto-cone in said body between said member and the front of said body and reciprocable coaxially of the latter, said inner jaws having follower surfaces, respectively, bearing against the periphery of said frusto-cone so as to be moved into gripping engagement with work on movement of said frusto-cone in one of its opposite directions of movement; and means for moving said member and frusto-cone in their opposite directions.

11. The combination in a chuck as set forth in claim 10, in which said frusto-cone is floatable laterally of said body axis to render said inner jaws self-compensating.

12. The combination in a chuck as set forth in claim 10, further comprising levers pivoted intermediate their ends in said body, each of said levers being operatively connected at one end with one of said inner jaws and having its other end in the path of said frusto-cone to be rocked thereby, on movement of the latter in a direction opposite to said one direction thereof, for the positive withdrawal of said inner jaws from gripping engagement with work.

13. In a chuck having a body with a central axis and angularly spaced pairs of aligned inner and outer work-gripping jaws movable on the front of the body substantially radially of its axis, the combination of an axially apertured member movable in said body coaxially thereof and having identical cam grooves; follower means connecting the cam grooves of said member with said outer jaws, respectively, for moving them into and from gripping engagement with work on movement of said member in first and second opposite directions, respectively; a shaft extending through the aperture in said member into the interior of said body and being movable coaxially of said body; a frusto-cone carried by the inner end of said shaft between said member and the front of said body, said inner jaws having follower surfaces, respectively, bearing against the periphery of said frusto-cone so as to be moved into gripping engagement with work on movement of said shaft and frusto-cone in a first direction opposite to said first direction of movement of said member; and a cylinder and a piston therein, each being movable relative to the other and said cylinder and piston being operatively connected with said member and shaft, respectively, for moving them in their respective first directions on admission of fluid under pressure to one side of said cylinder.

14. The combination in a chuck as set forth in claim 13, in which said piston is double-acting so that said member and shaft are moved opposite to their respective first directions of movement on admission of fluid under pressure to the other side of said cylinder.

15. The combination in a chuck as set forth in claim 13, in which said frusto-cone has limited floating movability on said inner shaft and laterally of said body axis to render said inner jaws self-compensating.

16. The combination in a chuck as set forth in claim 13, further comprising levers pivoted intermediate their ends in said body, each of said levers being operatively connected at one end with one of said inner jaws and having its other end in the path of said frusto-cone to be rocked thereby, on movement of said frusto-cone in a direction opposite to said first direction thereof, for the positive withdrawal of said inner jaws from gripping engagement with work.

References Cited in the file of this patent
UNITED STATES PATENTS

| Number | Name | Date |
|---|---|---|
| 566,702 | Sellers | Aug. 25, 1896 |
| 1,052,087 | Niedhammer | Feb. 4, 1913 |
| 2,422,785 | Johnson | June 24, 1947 |
| 2,613,943 | Trudeau | Oct. 14, 1952 |